US010766315B2

(12) United States Patent
Kim

(10) Patent No.: US 10,766,315 B2
(45) Date of Patent: Sep. 8, 2020

(54) TIRE HAVING CHAFER STRUCTURE FOR ENHANCING BEAD ENDURANCE

(71) Applicant: Hankook Tire Co., Ltd., Seoul (KR)

(72) Inventor: Jong Guk Kim, Daejeon (KR)

(73) Assignee: Hankook Tire Co., Ltd., Seoul (KR)

( * ) Notice: Subject to any disclaimer, the term of this patent is extended or adjusted under 35 U.S.C. 154(b) by 209 days.

(21) Appl. No.: 15/442,248

(22) Filed: Feb. 24, 2017

(65) Prior Publication Data

US 2018/0037068 A1 Feb. 8, 2018

(30) Foreign Application Priority Data

Aug. 8, 2016 (KR) ........................ 10-2016-0100619

(51) Int. Cl.
*B60C 15/06* (2006.01)
*B60C 9/04* (2006.01)

(52) U.S. Cl.
CPC .......... *B60C 15/06* (2013.01); *B60C 15/0635* (2013.01); *B60C 15/0653* (2013.01); *B60C 2009/0491* (2013.01); *B60C 2015/0614* (2013.01); *B60C 2015/0657* (2013.01); *B60C 2015/0675* (2013.01); *B60C 2015/0692* (2013.01)

(58) Field of Classification Search
CPC . B60C 15/06; B60C 15/0628; B60C 15/0635; B60C 15/0653; B60C 2015/0671; B60C 2015/0675; B60C 2009/229; B60C 2009/2032; B60C 2009/0491
See application file for complete search history.

(56) References Cited

U.S. PATENT DOCUMENTS

| 3,904,463 | A | * | 9/1975 | Boileau | ................. | B29D 30/08 |
| | | | | | | 152/555 |
| 4,219,601 | A | * | 8/1980 | Inoue | ..................... | B29C 70/16 |
| | | | | | | 152/451 |
| 4,265,292 | A | * | 5/1981 | Inoue | ................. | B60C 15/0027 |
| | | | | | | 152/543 |
| 5,004,031 | A | * | 4/1991 | Kadota | ................ | B60C 9/2204 |
| | | | | | | 152/527 |

(Continued)

FOREIGN PATENT DOCUMENTS

| JP | H09-086110 | * | 3/1997 |
| JP | 2006-160053 A | | 6/2006 |
| JP | 2007-045354 A | | 2/2007 |

(Continued)

OTHER PUBLICATIONS

English machine translation of KR10-20120007685. (Year: 2012).*

(Continued)

*Primary Examiner* — Robert C Dye
(74) *Attorney, Agent, or Firm* — Novick, Kim & Lee, PLLC; Jae Youn Kim; Jihun Kim

(57) ABSTRACT

The present invention provides a tire having improved bead endurance in which cords of a steel chafer are waved and the advancing direction of the waves of the steel chafer is perpendicular to the advancing direction of carcass cords, thereby minimizing cracks at an edge of the carcass. The tire having a chafer structure for enhancing bead endurance includes: a carcass having carcass cords; and a steel chafer covering the carcass and having a plurality of waved chafer cords.

4 Claims, 4 Drawing Sheets

(56) References Cited

U.S. PATENT DOCUMENTS

2011/0079343 A1* 4/2011 Ogawa .............. B29D 30/3028
156/117

FOREIGN PATENT DOCUMENTS

| | | |
|---|---|---|
| JP | 2009-255834 A | 11/2009 |
| KR | 10-0830044 B1 | 5/2008 |
| KR | 10-20120007685 * | 1/2012 |
| KR | 10-2012-0070034 A | 6/2012 |

OTHER PUBLICATIONS

English machine translation of JP2006-160053. (Year: 2006).*
English machine translation of JPH09-086110. (Year: 1997).*
English Translation of Korean Office Action dated Jun. 20, 2017 for Korean Patent Application No. 10-2016-0100619, 5 pages.

* cited by examiner

TIRE HAVING CHAFER STRUCTURE FOR ENHANCING BEAD ENDURANCE

CROSS-REFERENCE TO RELATED APPLICATION

This application claims priority to and the benefit of Korean Patent Application No. 10-2016-0100619, filed on Aug. 8, 2016, the disclosure of which is incorporated herein by reference in its entirety.

BACKGROUND OF THE INVENTION

Field of the Invention

The present invention relates to a tire having a chafer structure for enhancing bead endurance and, more particularly, to a tire having improve endurance by minimizing cracks at the edge of a carcass because the cords of a steel chafer are waved and the advancing direction of the waves of the cords of the steel chafer and the direction of carcass cords are perpendicular to each other.

Description of the Related Art

In general, a pneumatic tire receives large load and deformation from a vehicle while the vehicle runs, in which a large stress change is generated by relative motion of the rubber around the edge of a carcass. Cracks are generated around the edge of the carcass due to the stress change and grow and cause carcass separation or inner steel chafer separation.

The carcass edge is the part where cracks are generated most in the bead of a tire, the lower portion being in contact with a rim receives high pressure and torque, and the resistance in a rotational direction perpendicular to the direction in which force is applied to the carcass cords is low.

In order to protect the carcass under this condition, a chafer is disposed on the carcass and chafer cords are arranged usually at 30 to 60 degrees to the carcass cords.

In Korean Patent No. 10-0830044 (titled, "Pneumatic tire enforced bead member", hereafter referred to as Patent Document 1), there is disclosed a pneumatic tire that includes a tread, side walls, and beads, in which the beads cover a bead core and a bead filler with bead chafers 33, a carcass covers the beads, bead cushion rubber is disposed on the carcass, and a rim cushion is disposed on the rubber. Further, the distances from a bead heel to a bead filler edge, a rim cushion edge, a bead cushion rubber edge, and a carcass turn-up edge are sequentially increased, the rim cushion rubber has a peak on the outer side, side wall rubber overlaps the rim cushion rubber up to the peak, and the outer curved portion of the overlapping portion has a larger curvature than the curved portions of the side walls so that the overlapping portion is convex.

CITATION LIST

Patent Literature

Patent Literature 1: Korean Patent No. 10-0830044

SUMMARY OF THE INVENTION

The tire disclosed in Patent Document 1 has a problem that the angle between the cords of the chafer and the cords of the carcass is not specifically limited, so the cords of the chafer and the cords of the carcass are arranged at a common angle therebetween, thus there is a limit in improving the endurance due to cracks at the edge of the carcass even though the beads are enhanced.

The technical subjects to implement in the present invention are not limited to the technical problems described above and other technical subjects that are not stated herein will be clearly understood by those skilled in the art from the following specifications.

In order to achieve the objects of the present invention, an aspect of the present invention provides a tire having a chafer structure for enhancing bead endurance, the tire including: a carcass having carcass cords; and a steel chafer covering the carcass and a plurality of waved chafer cords.

The waved direction of the chafer cords may be perpendicular to the longitudinal direction of the carcass cords.

The chafer cords may become close to or substantially straight lines as they go to an edge of the carcass.

Rolling may be performed on the steel chafer.

The tire may further include a nylon chafer covering the steel chafer.

The carcass cords may be waved.

DETAILED DESCRIPTION OF THE PREFERRED EMBODIMENTS

Figure 1:
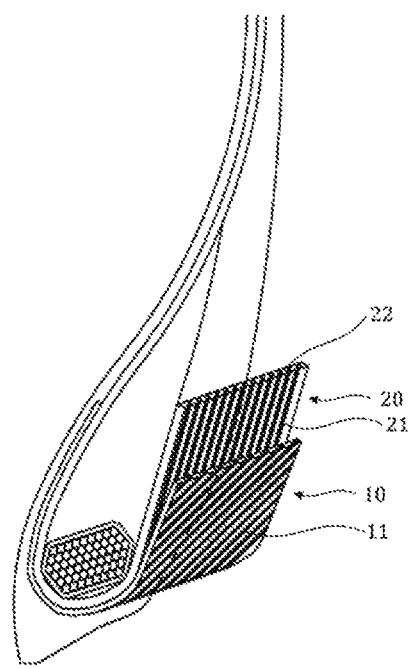
FIG. 1 is a schematic view of a carcass and a chafer of the related art.

The present invention is described hereafter with reference to the accompanying drawings. However, the present invention may be implemented in various ways and is not limited to the embodiments described herein. In the accompanying drawings, portions not related to the description will be omitted in order to obviously describe the present invention, and similar reference numerals will be used to describe similar portions throughout the present specification.

Throughout this specification, a case in which any one part is connected with (in contact with, coupled to, and combined with) the other part includes a case in which the parts are directly connected with each other and a case in which the parts are indirectly connected with each other with other component interposed therebetween. Further, unless explicitly described otherwise, "comprising" any components will be understood to imply the inclusion of other components rather than the exclusion of any other components.

Terms used herein are used only in order to describe specific embodiments rather than limiting the present invention. As used herein, the singular forms are intended to include the plural forms as well, unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Embodiments of the present invention are described hereafter in detail with reference to the accompanying drawings.

FIG. 1 is a schematic view of a carcass 20 and a chafer 10 of the related art.

A carcass edge 22 is the part where cracks are generated most in the bead of a tire, the lower portion of the carcass 20 being in contact with a rim receives high pressure and torque, and the resistance in a rotational direction perpendicular to the direction in which force is applied to the carcass cords 21 is low.

In order to protect the carcass 20 under this condition, as shown in FIG. 1, the chafer 10 is disposed on the carcass 20 such that the longitudinal directions of the carcass cords 21 and the chafer cords 11 are arranged at 30 to 60 degrees.

Figure 2:
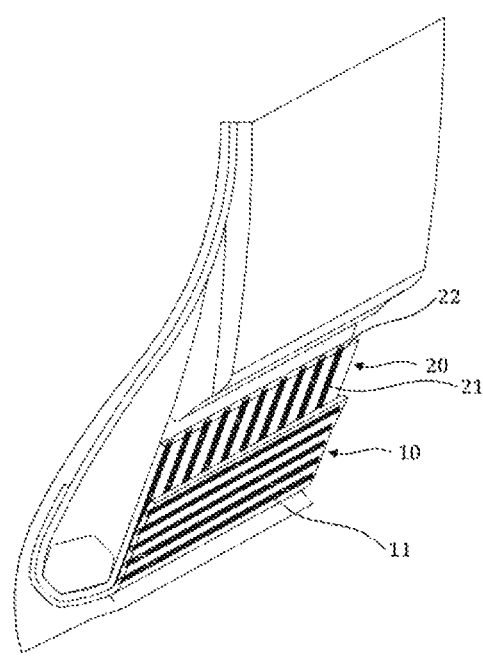
FIG. 2 is a schematic view when carcass cords and chafer cords are perpendicular to each other.

FIG. 2 is a schematic view when the carcass cords 21 and the chafer cords 11 are perpendicular to each other.

As shown in FIG. 1, the longitudinal direction of the chafer cords 11 makes an angle with respect to the longitudinal angle of the carcass cords 21, thereby making a bead. Theoretically, as shown in FIG. 2, when the chafer cords 11 are arranged perpendicular to the longitudinal direction of the carcass cords 21 which is the lateral direction in which force is applied from a rim, it may be the most advantageous in terms of preventing cracks at the edge 22 of the carcass.

However, when the chafer 10 is installed, it is lifted up to a tire drum (not shown), so the length of the chafer 10 is increased. Further, when the longitudinal direction of the chafer cords 11 is perpendicular to the longitudinal direction of the carcass cord 21, the chafer 10 composed of the chafer cords 11 made of steel and perpendicular to the carcass cords 21 may be cut due to a low tensile modulus. Force is applied not in the longitudinal direction of the chafer cord 11, but in the direction perpendicular to the longitudinal direction of the chafer cord 11, so the tensile modulus against the force generated by combination of the chafer cords 11 in the chafer 10 and materials outside the chafer cords 11 may be reduced.

Figure 3:
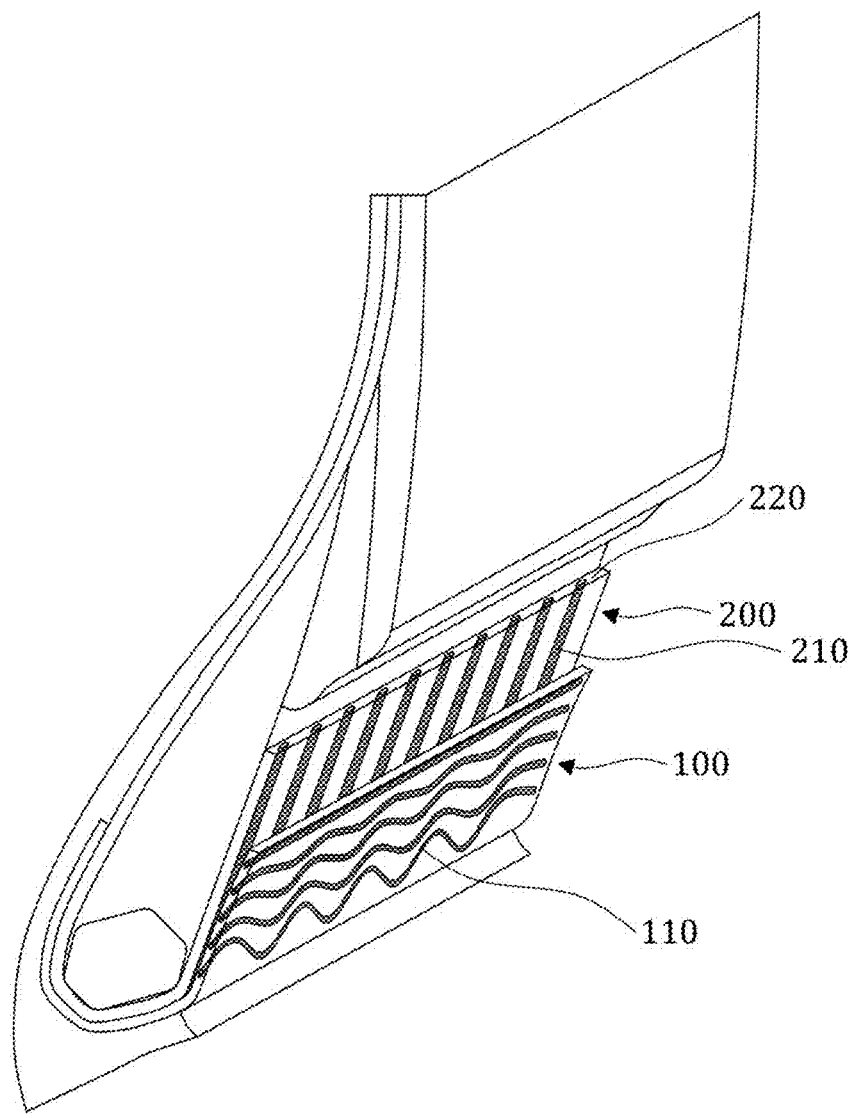
FIG. 3 is a schematic view of a steel chafer and a carcass according to an embodiment of the present invention.
Figure 4A:
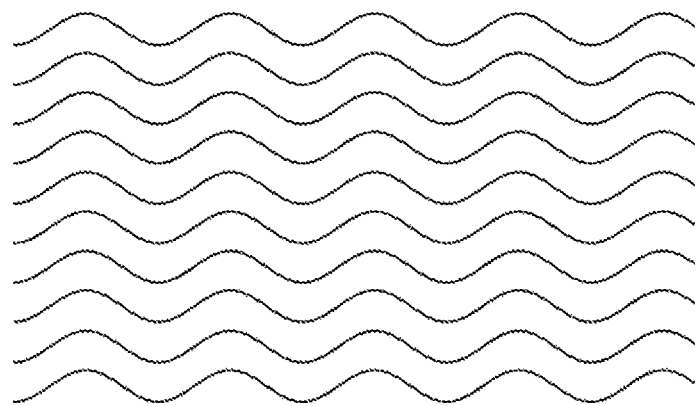
FIGS. 4A and 4B are schematic views showing the shapes of a chafer cord according to some embodiments of the present invention.
Figure 4B:
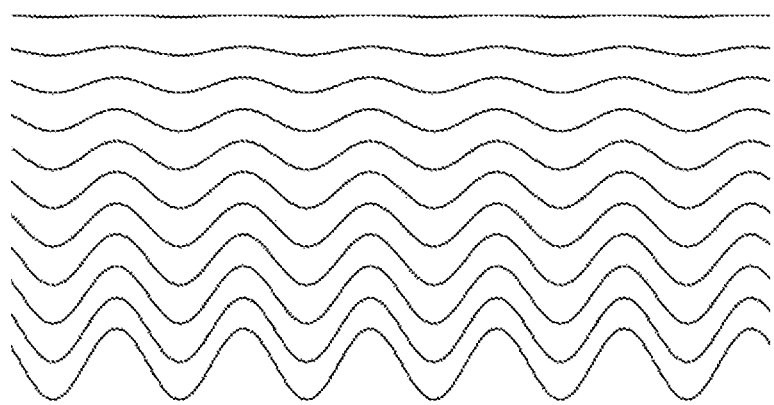

FIG. 3 is a schematic view of a steel chafer 100 and a carcass 200 according to an embodiment of the present invention and FIGS. 4A and 4B are schematic views showing the shapes of chafer cords 110 according to some embodiments of the present invention (the tops in (A) and (B) of FIG. 4 are the carcass edges 22).

As shown in FIG. 3, a tire having a chafer structure improving bead durability of the present invention may include: a carcass 200 having carcass cords 210; and a steel chafer 100 covering the carcass 200 and having a plurality of waved chafer cords 110.

As shown in FIG. 3, the waved direction of the chafer cords 110 may be perpendicular to the longitudinal direction of the carcass cords 210.

According to an embodiment of the present invention, although the waved direction of the chafer cords 110 is perpendicular to the longitudinal direction of the carcass cords 210, the present invention is not limited thereto, and the waved direction of the chafer cords 110 may be arranged at 60 to 90 degrees to the longitudinal direction of the carcass cords 210 (where the waved direction of the chafer cords 110 may mean the advancing direction of the waves.

As shown in FIG. 4A, a plurality of chafer cords 110 may be formed in a waved shape.

As described with reference to FIG. 2, arranging the longitudinal direction of the chafer cords 110 perpendicular to the longitudinal direction of the carcass cords 210 is the most advantageous in terms of preventing cracks at the carcass edge 220, but may cause a problem with installation. In order to solve this problem, the chafer cords 110 may be waved and perpendicular to the carcass cords 210 in the present invention.

Accordingly, the steel chafer 100 can absorb high pressure and torque due to deformation of the carcass 200 in the direction perpendicular to the longitudinal direction of the carcass cord 210. Further, even if force is applied to the steel chafer 100 in the longitudinal direction of the carcass cord 210, tension is increased by the waved shape of the chafer cords 110, so the steel chafer 100 can absorb high pressure and torque in the longitudinal direction of the carcass cord 210. Therefore, the endurance of the bead can be consequently improved.

When the chafer cords 110 are waved, even if force is applied in the direction perpendicular to the longitudinal direction of the chafer cords 110, it is possible to obtain tension in the chafer for endurance of the bead by not only the coupling force between the chafer cords 110 in the chafer and the materials outside the chafer cords 110, but the force applied to the chafer cords 110 themselves.

Further, as shown in FIG. 4B, the chafer cords 110 are less waved close to or substantially straight lines as they go to the carcass edge 220.

In manufacturing of a tire, the chafer cords 110 close to the carcass edge 220 where deformation is large may be less waved, close to or substantially straight line, but the lower end of the bead opposite to the carcass edge 220 is less deformed (lifted), so the chafer cords 110 can be maintained in the waved shape.

Rolling may be performed on the steel chafer 100.

The waved chafer cords 110 of the steel chafer 100 may be formed by rolling.

The tire of the present invention may further include a nylon chafer covering the steel chafer 100.

As for tires for medium and heavy weight, high pressure and torque may be applied to the carcass 200 as compared with common tires, so a nylon chafer covering the steel chafer 100 may be further provide don the steel chafer 100, whereby it is possible to improve the endurance of the bead.

The carcass cords 210 may be waved.

The carcass cords 210 may be longitudinally waved.

When the carcass cords 210 are waved, the carcass 200 can have improved endurance against high pressure and torque generated in the direction perpendicular to the carcass cords 210.

The above description is an example of the present invention and those skilled in the art may understand that the present invention may be easily modified in other ways without changing the necessary characteristics or the spirit of the present invention. Therefore, the embodiments described above are only examples and should not be construed as being limitative in all respects. For example, the single components may be divided, respectively, and the separate components may be combined.

The scope of the present invention is defined by the following claims, and all of changes and modifications obtained from the meaning and range of claims and equivalent concepts should be construed as being included in the scope of the present invention.

The present invention has an effect of improving endurance by minimizing cracks at an edge of the carcass, as cords of a steel chafer are waved and the advancing direction of the waves of cords of the steel chafer is perpendicular to the advancing direction of carcass cords.

The effects of the present invention are not limited to those described above and should be construed as including all of effect that can be inferred from the configuration of the present invention described in the detailed description or claims.

What is claimed is:

1. A tire having a chafer structure for enhancing bead endurance, the tire comprising:
    a carcass having waved carcass cords; and
    a steel chafer covering the carcass and having a plurality of waved chafer cords which are formed in a direction perpendicular to a longitudinal direction of the carcass cords and arranged in a radial direction with respect to one another,
    wherein the waved chafer cords have an amplitude that decreases in the radial direction as they get close to an edge of the carcass and the amplitude of a chafer cord of the plurality of waved chafer cords closest to the edge of the carcass is the smallest amplitude,
    wherein the carcass is configured to absorb pressure and torque applied in the direction perpendicular to the longitudinal direction of the carcass cords,
    wherein the steel chafer is configured to absorb pressure and torque applied in the longitudinal direction of the carcass cord, and
    wherein the waved chafer cord of the plurality of waved chafer cords closest to the edge of the carcass is substantially straight.

2. The tire of claim 1, wherein a rolling process by a machine is performed on the steel chafer.

3. The tire of claim 1, further comprising a nylon chafer covering the steel chafer.

4. The tire of claim 1, wherein the steel chafer is configured to absorb the pressure and torque applied in the longitudinal direction of the carcass cord, based on an increase in tension of the waved chafer cords with respect to a force of the longitudinal direction of the carcass cord.

* * * * *